United States Patent
Lopez et al.

(10) Patent No.: US 11,025,463 B2
(45) Date of Patent: Jun. 1, 2021

(54) FIRST NETWORK NODE AND A METHOD THEREIN FOR GENERATION AND TRANSMISSION OF A BINARY PHASE SHIFT KEYING (BPSK) SIGNAL

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 16/473,634

(22) PCT Filed: Feb. 3, 2017

(86) PCT No.: PCT/SE2017/050094
§ 371 (c)(1),
(2) Date: Jun. 26, 2019

(87) PCT Pub. No.: WO2018/143843
PCT Pub. Date: Aug. 9, 2018

(65) Prior Publication Data
US 2021/0135913 A1   May 6, 2021

(51) Int. Cl.
*H04L 27/20* (2006.01)
*H04L 27/12* (2006.01)
(Continued)

(52) U.S. Cl.
CPC ........ *H04L 27/2003* (2013.01); *H04L 5/0007* (2013.01); *H04L 27/0008* (2013.01); *H04L 27/12* (2013.01); *H04L 27/2035* (2013.01)

(58) Field of Classification Search
CPC . H04L 27/2035; H04L 27/2003; H04L 27/12; H04L 5/0007; H04L 27/0008; H04L 27/00
(Continued)

(56) References Cited

U.S. PATENT DOCUMENTS

| 2006/0203943 A1* | 9/2006 | Scheim | H04L 1/0059 |
|---|---|---|---|
|  |  |  | 375/341 |
| 2010/0046463 A1 | 2/2010 | Green |  |

(Continued)

FOREIGN PATENT DOCUMENTS

| WO | WO 2015/028089 A1 | 3/2015 |
| WO | WO 2017/167376 A1 | 10/2017 |
| WO | WO 2017/167380 A1 | 10/2017 |

OTHER PUBLICATIONS

International Search Report and Written Opinion of the International Searching Authority for International Application No. PCT/SE2017/050094 dated Aug. 31, 2017.
(Continued)

*Primary Examiner* — Leila Malek
(74) *Attorney, Agent, or Firm* — Sage Patent Group (57) ABSTRACT

A first network node (NN) and a method therein for generation and transmission of a Binary Phase Shift Keying (BPSK) signal to a second NN. The first and second NNs are operating in a communications network. The first NN generates a third bit stream x(n) from a first bit stream d(n) of data for transmission, wherein each output bit comprised in the third bit stream depends on a transition in bit values between two input bits from the first bit stream. Further, the first NN generates a fourth bit stream y(n) from the third bit stream by expanding the third bit stream by a predetermined factor M. By means of a CPM signal generating module, the first NN generates a BPSK signal based on the fourth bit stream. Furthermore, the first NN transmits the BPSK signal to an OFDM signal receiving module of the second NN.

20 Claims, 5 Drawing Sheets

Method performed by first network node 102

(51) Int. Cl.
  *H04L 5/00*  (2006.01)
  *H04L 27/00*  (2006.01)
(58) Field of Classification Search
  USPC .......................................................... 375/308
  See application file for complete search history.

(56) References Cited

U.S. PATENT DOCUMENTS

2010/0061320 A1   3/2010  Lakkis
2014/0029697 A1*  1/2014  Yang ................... H04L 25/0328
                                                                   375/305

OTHER PUBLICATIONS

ASTRI, "Power classification for FDMA with GMSK modulation for uplink in NB-IOT," R4-155704, 3GPP TSG-RAN WG4 Meeting #76bis, Sophia Antipolis, France, Oct. 12-16, 2015, 3 pages.
Sklar, "Digital Communications," Prentice Hall PTR, $2^{nd}$ edition, 2000, pp. 559-562.
Swiss Technical Institute of Technology Zurich, "SV8: Continuous Phase Modulation," Sep. 21, 2016, 14 pages.
Emammer Shafter et al., "OFDM Systems with CPM Mappers for Smart Grid Applications," EPEC15, 2015 IEEE Electrical Power and Energy Conference, pp. 424-428.

* cited by examiner

Figure 1

Figure 2 Method performed by first network node 102

FIRST NETWORK NODE AND A METHOD THEREIN FOR GENERATION AND TRANSMISSION OF A BINARY PHASE SHIFT KEYING (BPSK) SIGNAL

CROSS REFERENCE TO RELATED APPLICATION

This application is a 35 U.S.C. § 371 national stage application of PCT International Application No. PCT/SE2017/050094, filed on Feb. 3, 2017, the disclosure of which is hereby incorporated herein by reference in its entirety.

TECHNICAL FIELD

Embodiments herein relate generally to a first network node and to a method therein. In particular they relate to generation and transmission of a Binary Phase Shift Keying (BPSK) signal.

BACKGROUND

Wireless devices such as terminals are also known as e.g. User Equipments (UEs), mobile terminals, stations (STAs), wireless terminals, communication devices and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNodeB or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave links, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

A Wireless Local Area Network (WLAN) is a wireless communications network that links two or more communications devices using a wireless distribution method, such as spread-spectrum or Orthogonal Frequency Division Multiplexing (OFDM), within a limited area such as a home, school, computer laboratory, or office building. This gives users the ability to move around within a local coverage area and yet still be connected to the communications network. A WLAN can also provide a connection to the wider Internet.

Most modern WLANs are based on the Institute of Electrical and Electronics Engineers (IEEE) 802.11 standards and are marketed under the Wi-Fi brand name.

The IEEE 802.11 is a set of Media Access Control (MAC) and Physical layer (PHY) specifications for implementing WLAN communication in the 900 MHz and 2.4, 3.6, 5, and 60 GHz frequency bands. They are created and maintained by the IEEE LAN/MAN Standards Committee (IEEE 802).

Internet of Things (IoT) is expected to significantly increase the number of wireless devices connected in a wireless communications network. A vast majority of these wireless devices will likely operate in unlicensed bands, such as the 2.4 GHz Industrial, Scientific, Medical (ISM) band. At the same time, there is also an increased demand for using the unlicensed bands also for services that traditionally have been supported in licensed bands. As an example of the latter, the third Generation Partnership Project (3GPP) that traditionally develop specifications only for licensed bands has now also developed versions of Long Term Evolution (LTE) which will operate in the 5 GHz unlicensed band.

Technologies that are expected to dominate for IoT services are Bluetooth Wireless Technology, in particular Bluetooth Low Energy (BLE) and future versions of the Institute of Electrical and Electronics Engineers (IEEE) 802.11 standard such as the IEEE 802.11ax standard. A communications network according to the IEEE 802.11 ax is a type of Wireless Local Area Network (WLAN) in the IEEE 802.11 set of types of WLANs. It is designed to improve overall spectral efficiency. With respect to the IEEE 802.11 standard, there have been attempts to initiate the standardization of a long range low power mode which at least to some extent builds upon the above mentioned IEEE 802.11ax standard.

The IoT applications are foreseen to most often have rather different requirement and features as compared to applications like e.g. file down-load and video streaming. Specifically, the IoT applications would typically only require low data rate and the amount of data transmitted in a single packet may many times only be a few bytes. In addition, the transmissions to and from many wireless devices will be very seldom, e.g. once an hour or even less often. The number of IoT wireless devices is expected to be huge which means that although the amount of data to each one of the wireless devices many be small, the aggregated IoT data transmitted may still be substantial. Many use cases for IoT applications may be found in an ordinary house, and may be related to various sensors, actuators, etc. The requirements for radio coverage are therefore substantially less than what usually may be achieved by e.g. a cellular communications system. On the other hand, the coverage which may be obtained by e.g. Bluetooth or the IEEE 802.11b/g/n/ac may not suffice. This may be true if one of the wireless devices is outdoors whereas the other wireless device is indoors so that an exterior with rather high penetration loss is in between the two wireless devices.

Due to this short-coming of current versions of the Bluetooth wireless technology and the IEEE 802.11 standards, both these standardization organizations are working on new versions that would significantly increase radio coverage of the IoT communications network.

The straightforward approach to increase the range of a communication link, and thereby improve the radio coverage, is to reduce the bit rate that is used. Reducing the bit rate by necessity means that it will take longer time to transmit a packet of a certain size. As a side effect of this, the channel will be occupied for a longer period of time. However, with many wireless devices sharing the same channel, the channel may be congested if this sharing is not done in an effective way. The need for long packets and the increased number of users, i.e. the increased number of wireless devices, will make this congestion even more pronounced.

Moreover, the amount of non-IoT data, e.g. data download and video streaming, sent over the same channel may also increase. This implies that in order to obtain good performance for both IoT applications and non-IoT applications, some coordination should preferably take place.

One way to do such coordination is by time sharing between the IoT communications network and the non-IoT communications network. However, as the data rate for the IoT communications network is very low for the individual communications links, it may likely be hard to obtain good spectrum efficiency in this way. Instead it would be preferable if the two communications networks, i.e., both the IoT communications network and the non-IoT communications network could operate concurrently. One means to achieve this may be if the non-IoT communications network would be based on OFDM. Concurrent operation may then be achieved by assigning one or more sub-carriers to the IoT communications network and the remaining ones to the non-IoT communications network. The number of subcarriers allocated to the IoT communications network may in this way be rather flexible. One way to achieve this concurrent operation is to enhance the IEEE 802.11ax standard that supports OFDMA. The enhancement would allow an IEEE 802.11ax Access Point (AP) to receive and transmit to Narrowband (NB) wireless devices, such as IoT wireless devices.

The OFDM is known to suffer severely from a high Peak-to-Average-Ratio (PAR), which means less power efficient transmission. Since an IoT wireless device, such as a sensor, may be powered by a small battery such as a coin battery, power efficiency is one of the key features. At the same time Bluetooth Wireless Technology is based on modulation technique called Gaussian Frequency Shift Keying (GFSK). The GFSK is a constant envelope modulation which allows for extremely cost efficient implementations. At a receiver side, e.g. at a receiving node, one may use a simple limiting receiver, i.e., the Analog-to-Digital Converter (ADC) may be replaced by a simple comparator and there will essentially be no need for Automatic Gain Control (AGC) in the receiving node, further simplifying the implementation and reducing the cost. Even more significant is the gain at the transmitter side, e.g. at a transmitting node. Since GFSK is a constant envelope modulation, there is much less need to back-off the Power Amplifier (PA) and there are much less linearity requirements on the PA, so that significantly higher power efficiency can be obtained. By the expression "back-off the PA" when used herein is meant that one back-off in output power in order to let the PA operate in a region where it is essentially linear. Furthermore, there are technologies based on the IEEE 802.15.4 standard that employ other forms of Continuous Phase Modulation (CPM) such as Offset-Quadrature Phase Shift Keying (O-QPSK) using a half-sine pulse shaping filter and Gaussian Minimum Shift Keying (GMSK), which possess similar properties as the GFSK and are well suited for energy efficient IoT wireless devices.

SUMMARY

Concurrent operation of narrowband wireless devices, e.g. IoT wireless devices, and wideband wireless devices poses many challenges to designers of the Physical Layer (PHY). Although re-use of existing energy efficient hardware, e.g. Bluetooth chipsets or the IEEE 802.15.4 chipsets, for the narrowband wireless devices is desirable, concurrent operation with wideband wireless devices imposes restrictions on the achievable data rates for the narrowband wireless devices. Hence spectrally efficient modulation techniques, compatible with existing energy efficient chipsets, are sought.

Embodiments disclosed herein aim to overcome the above-mentioned challenges. Thus, an object of embodiments herein is to address at least some of the drawbacks with the prior art and to improve the performance in a wireless communications network.

According to one aspect of embodiments herein, the object is achieved by a method performed by a first network node for generation and transmission of a Binary Phase Shift Keying (BPSK) signal to a second network node. The first and second network nodes are operating in a communications network.

The first network node generates a third bit stream $x(n)$ from a first bit stream $d(n)$ of data for transmission, wherein each output bit comprised in the third bit stream $x(n)$ depends on a transition in bit values between two input bits from the first bit stream $d(n)$.

Further, the first network node generates a fourth bit stream $y(n)$ from the third bit stream $x(n)$ by expanding the third bit stream $x(n)$ by a predetermined factor M.

By means of a Continuous Phase Modulation (CPM) signal generating module comprised in the first network node, the first network node generates a BPSK signal based on the fourth bit stream $y(n)$.

Furthermore, the first network node transmits the BPSK signal to an Orthogonal Frequency Division Multiplexing (OFDM) signal receiving module of the second network node.

According to another aspect of embodiments herein, the object is achieved by a first network node for generation and transmission of a Binary Phase Shift Keying (BPSK) signal to a second network node. The first and second network nodes are configured to operate in a communications network.

The first network node is configured to generate a third bit stream $x(n)$ from a first bit stream $d(n)$ of data for transmission, wherein each output bit comprised in the third bit stream $x(n)$ depends on a transition in bit values between two input bits from the first bit stream $d(n)$.

Further, the first network node is configured to generate a fourth bit stream $y(n)$ from the third bit stream $x(n)$ by expanding the third bit stream $x(n)$ by a predetermined factor M.

The first network node is configured to generate a BPSK signal based on the fourth bit stream $y(n)$ by means of a Continuous Phase Modulation (CPM) signal generating module comprised in the first network node.

Furthermore, the first network node is configured to transmit the BPSK signal to an Orthogonal Frequency Division Multiplexing (OFDM) signal receiving module of the second network node.

According to another aspect of embodiments herein, the object is achieved by a computer program, comprising instructions which, when executed on at least one processor, causes the at least one processor to carry out the method performed by the first network node.

According to another aspect of embodiments herein, the object is achieved by a carrier comprising the computer program, wherein the carrier is one of an electronic signal, an optical signal, a radio signal or a computer readable storage medium.

Since the first network node generates the BPSK signal based on the fourth bit stream $y(n)$ by means of the CPM signal generating module, the use of a power efficient chipset such as a chip-set used to generate CPM signals, is enabled, thereby reducing or minimizing the power consumption. This results in an improved performance in the wireless communications network.

An advantage of some embodiments herein is that power efficient hardware, e.g. chipsets such as a Bluetooth Low energy chipset or an IEEE 802.15.4 chipset, may be used in communications networks supporting OFDM such as enhanced variants of the IEEE 802.11 communications networks. This is especially advantageous in wireless communications network allowing concurrent operation of narrowband (NB) devices and wideband (WB) devices, since this typically will result in overall improved spectrum efficiency compared to a solution which is based on that the NB and WB devices would have to share the channel by means of time division.

Another advantage of some embodiments herein is that the hardware used to generate the NB signal, i.e. the BPSK signal, may also be used to generate signals that are compliant with e.g. BLE, thus allowing for cost efficient support of more than one standard.

BRIEF DESCRIPTION OF DRAWINGS

Examples of embodiments herein are described in more detail with reference to attached drawings in which.

DETAILED DESCRIPTION

Some embodiments disclosed herein relate to recent technology trends that are of particular interest in the 5G context. However, it should be understood that embodiments disclosed herein may be applicable also in 4G communications network and in future communications networks.

Some embodiments herein disclose methods to generate a BPSK signal by means of a CPM signal generator in such a way that the generated BPSK signal may be successfully received by an OFDM receiver. Such methods are useful in for example IoT scenarios wherein low power IoT wireless devices, e.g. based on Bluetooth hardware or IEEE 802.15.4 hardware capable of generating CPM signals, are scheduled for concurrent uplink transmission in an FDMA fashion, and to transmit the generated BPSK signal to an OFDMA receiver, such as an enhanced IEEE 802.11ax AP.

It should be understood that the expression "BPSK signal" when used in this disclosure also is to encompass a BPSK-like signal, e.g. a signal having one or more properties in common with a BPSK signal. Examples of such properties are the use of a waveform with a fixed frequency and two possible phases to convey a bit, as described by A. Glenn in "Comparison of PSK vs FSK and PSK-AM vs FSK-AM Binary-Coded Transmission Systems" IRE Transactions on Communications System, 1960, Volume: 8, Issue: 2.

In addition, in this disclosure it is understood that in a BPSK signal it is allowed to modulate the carrier frequency during time intervals substantially shorter than the signalling period, so that the generated waveform is in practice slightly distorted relative to a BPSK signal generated according to the A. Glenn reference. For example, according to some embodiments disclosed herein signals may be generated that are equal to "traditional" BPSK for $15/16$ of the bit period but introduce a distortion during $1/16$ of the duration of the bit period. In practice conventional BPSK generators often employ filtering or windowing to control spectral side lobes, and this also results in distortions when compared to BPSK as defined in the A. Glenn reference, exemplifying that the introduction of some distortion at the transmitter is often tolerable. Moreover, in some embodiments in this disclosure, the BPSK may be used in conjunction with Frequency Shift Keying (FSK), meaning that during a signalling period the waveform has one substantially constant frequency and two possible phases, but the carrier frequency may change from one signalling period to the next. In this way, the data rate of BPSK is enhanced and 2 bits may be communicated during one signalling period. A first bit determines the phase, while a second bit determines the frequency, for the duration of one signalling period. In some embodiments, such signals resulting from a combination of BPSK and FSK are called BPSK-FSK signals in this disclosure. Further, the BPSK signal in this disclosure is generated by a signal generator different from a BPSK signal generator. Furthermore, it should be understood that the term "signal" may be waveform or a digital signal.

Figure 1:
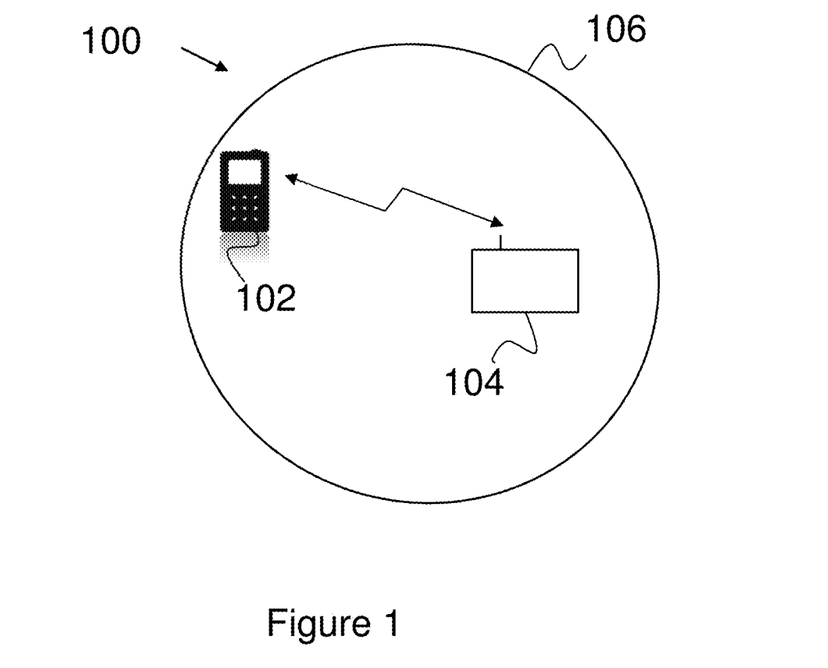
FIG. 1 is a schematic block diagram schematically illustrating embodiments of a wireless communications network.

As schematically illustrated in FIG. 1, embodiments herein relate to a wireless communications network 100. The wireless communications network 100 may be an 802.11 wireless network, an NX communications network, an Universal Mobile Telecommunications System (UMTS) network, a Long-Term Evolution (LTE) network, a Wideband Code Division Multiple Access (WCDMA) network, a Global System for Mobile Communications (GSM) network, any 3GPP cellular network, a Worldwide Interoperability for Microwave Access (Wimax) network, or any other wireless communication network or system configured to support MTC.

A first network node 102 is configured to operate in the communications network 100. The first network node 102 is capable of generating a CPM signal with a modulation index h=0.5 and a bit period $T_{CPM}$. The first network node 102 may be a wireless device such an IoT device or a Machine Type Communications (MTC) device. The first network node 102 may also be referred to as a wireless communications device. The first network node 102 may e.g. be a user equipment, a mobile terminal or a wireless terminal, a mobile phone, a computer such as e.g. an laptop, a Personal Digital Assistant (PDA) or a tablet computer, sometimes referred to as a tablet, with wireless capability, or any other radio network units capable to communicate over a radio link in the wireless communications network 100. Please note the term user equipment used in this document also covers other wireless devices such as Machine to Machine (M2M) devices, even though they do not have any user.

A second network node 104 is arranged and configured to operate in the wireless communication network 100. The second network node 104 is configured for wireless communication with the first network node 102 when it is located within a coverage area 106 served by the second network node 104. The coverage area 106 is sometimes referred to as a cell, or a radio coverage area.

The second network node 104 may be a transmission point such as an Access Point (AP), a radio base station, for example a gNB, an eNB also referred to as an eNodeB, or an Home Node B, an Home eNode B or any other network node capable to serve a user equipment or a machine type communication device in a wireless communications network, such as the wireless communications network 100. The second network node 104 may be or may comprise an OFDMA receiver, such as an enhanced IEEE 802.11ax AP.

The second network node 104 may further be configured to communicate with a core network node operating in a core network of the communications network 100.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 2:
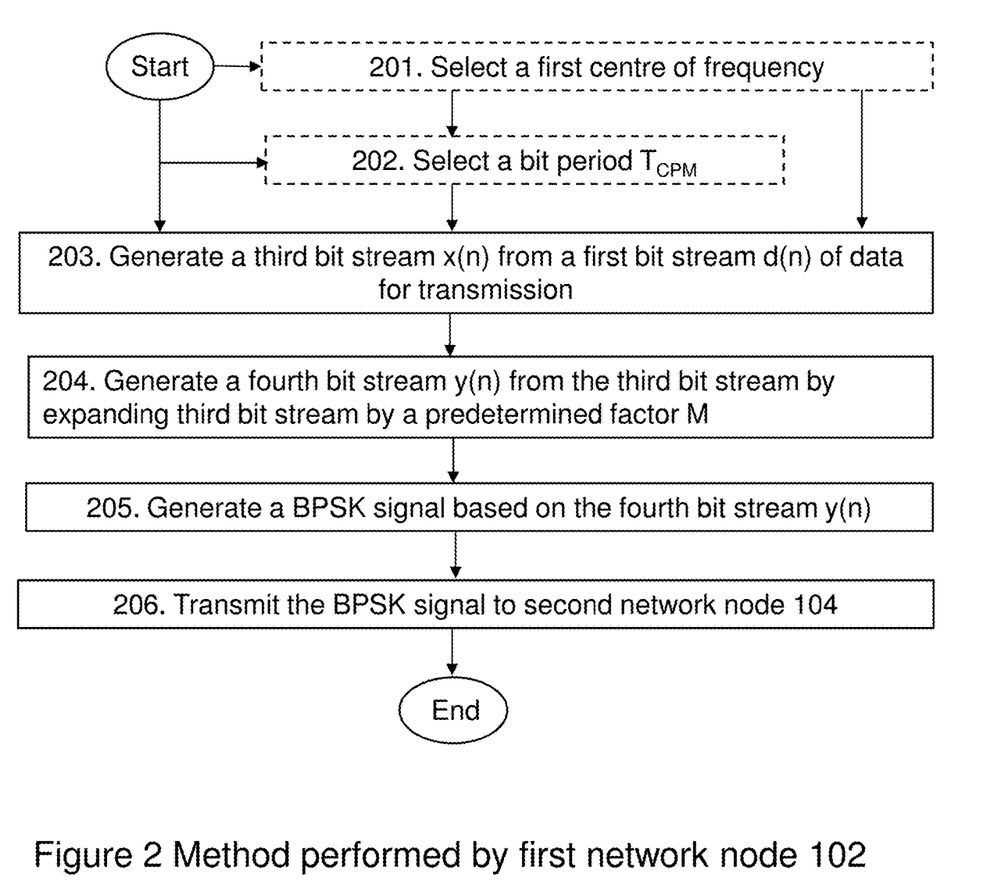
FIG. 2 is a flowchart schematically illustrating embodiments of a method performed by a first network node.

An example of a method performed by the first network node 102 for generation and transmission of a BPSK signal to the second network node 104, will now be described with reference to the flowchart depicted in FIG. 2. As previously mentioned, the first network node 102 and the second network node 104 operate in the wireless communications network 100.

Furthermore, as previously mentioned, the first network node 102 is capable of generating a CPM signal with a modulation index h=0.5, and a bit period $T_{CPM}$.

One or more of the Actions below may be combined and/or performed in another suitable order. Further, one or more actions may be optional.

Action 201

Figure 5:
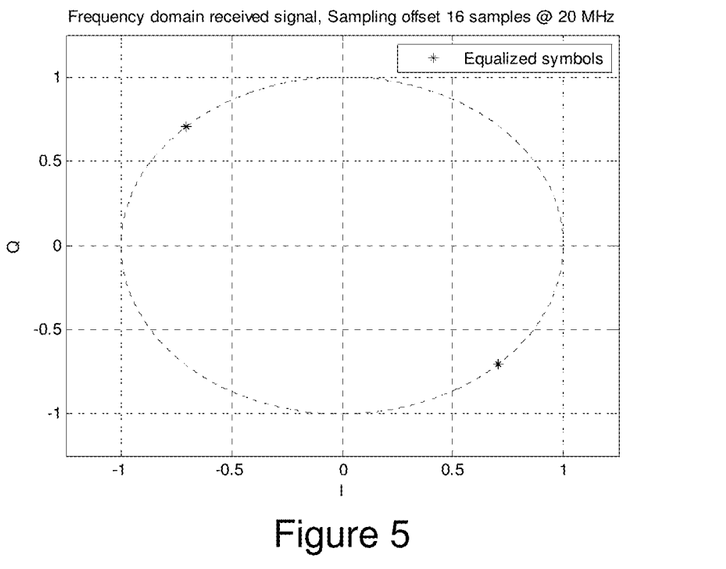
FIG. 5 schematically illustrates a constellation diagram (an I/Q diagram) of received signal after equalization.

In some first embodiments, the first network node 102 may select a first centre frequency of the first network node 102 to be separated by a predetermined number of frequency units from a second centre frequency of a subcarrier in of one of the OFDM subcarriers used by the second network node 104. This is done in order to be able to generate one or more RF signals whose spectral content is concentrated near the centre of frequency of one OFDM subcarrier and hence is able to be received by the second network node 104. This is schematically illustrated in FIG. 5 that is to be described below.

The predetermined number of frequency units may result in a frequency separation between the first and second centre frequencies that is equal to a maximum frequency deviation of signals generated by a CPM signal generating module 305.

The maximum frequency deviation of the BPSK signal may be equal to a frequency spacing between two OFDM signals.

Figure 6:
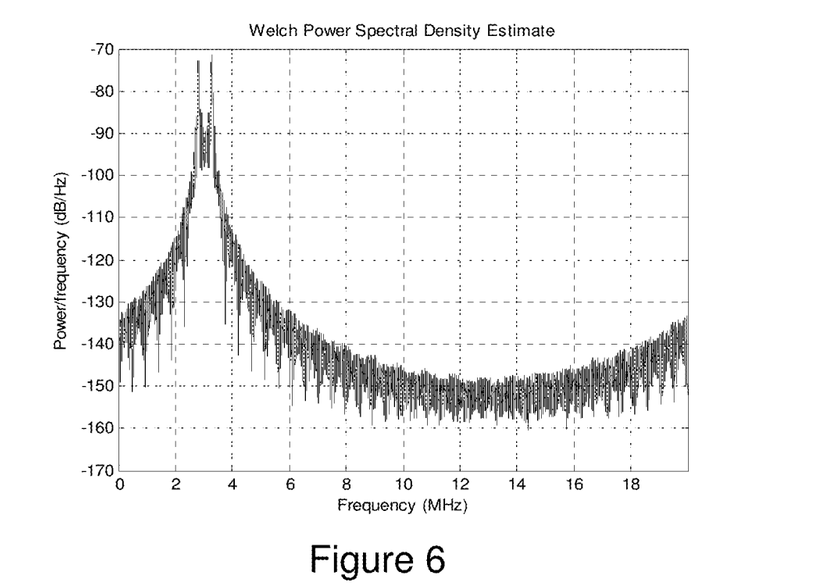
FIG. 6 schematically illustrates the power spectrum density of a transmitted BPSK and FSK (BPSK-FSK) signal.

In some second embodiments, the first network node 102 may select a first centre frequency of the first network node 102 to coincide with a second centre frequency of a subcarrier in of one of the OFDM subcarriers used by the second network node 104. This is done in order to be able to generate one or more RF signals whose spectral content is concentrated near the centres of frequency of one or more OFDM subcarriers and hence is able to be received by the second network node 104. This is schematically illustrated in FIG. 6 that is to be described below.

The first centre frequency may be a nominal centre frequency.

Further, the OFDM subcarrier may be a subcarrier in an OFDM channel raster used by the second network node 104.

Action 202

In some embodiments, e.g. in some first and/or second embodiments, the first network node 102 may select a bit period $T_{CPM}$ such that a predetermined factor M multiplied with the bit period $T_{CPM}$ is equal to a time duration of one OFDM symbol $T_{OFDM}$ plus a time duration of a cyclic prefix $T_{CP}$. The bit period $T_{CPM}$ is a period of time for a bit and may therefore sometimes also be referred to as bit period of time or a bit duration. The bit period $T_{CPM}$ is a property of a CPM signal generating module 305 comprised in the first network node 102. By selecting the bit period $T_{CPM}$ such that a predetermined factor M multiplied with the bit period $T_{CPM}$ is equal to a time duration of one OFDM symbol $T_{OFDM}$ plus a time duration of a cyclic prefix $T_{CP}$, the signal generated by means of the CPM generator is made compatible with a Fast Fourier Transformation (FFT) size and sampling rate used by the second network node 104, e.g. an OFDM receiver, in the sense that a conventional FFT-based OFDM receiver may be used to demodulate the signal, e.g. the BPSK signal, transmitted by the first network node 102.

Action 203

In order to obtain a sequence of phase shifts to be used for phase shift keying, the first network node 102 generates a third bit stream x(n) from a first bit stream d(n) of data for transmission, wherein each output bit comprised in the third bit stream x(n) depends on a transition in bit values between two input bits from the first bit stream d(n). Thus, the first bit stream d(n) comprises data to be transmitted.

Further, by generating the third bit stream x(n) from the first bit stream d(n) such that each output bit comprised in the third bit stream x(n) depends on the transition in bit values between two input bits from the first bit stream d(n). This is needed because the CPM signal generating module 305, e.g. a CPM generator, is not able to introduce instantaneous shifts in phase, which are present in a BPSK signal as defined in the A. Glenn reference. Rather the phase is changed continually, and any changes in the phase take as a starting point the previous phase of the signal.

In some embodiments, the first network node 102 generates the third bit stream x(n) from the first bit stream x(n) by:

assigning an output bit of the third bit stream x(n) a first value when there is no transition in bit values between a first input bit and a second input bit from the first bit stream d(n), and assigning the output bit of the third bit stream x(n) a second value when there is a transition in bit values between the first input bit and the second input bit. The first and second input bits are consecutive input bits, and one of the first and second values is 1 and the other one of the first and second values is 0.

Alternatively or additionally, the first network node 102 may generate the third bit stream x(n) from the first bit stream d(n) by differentially encoding the first bit stream d(n) to generate the third bit stream x(n).

Action 204

In order to obtain a BPSK signal that may be received by the second network node 104, e.g. by an OFDM receiver in the second node 104, the first network node 102 generates a fourth bit stream y(n) from the third bit stream x(n) by expanding the third bit stream x(n) by a predetermined factor M. Expansion implies the introduction of sequences of bits with the same value among the bits from the third sequence x(n). When a sequence of bits having the same value is fed to a CPM generator, e.g. to the CPM signal generating module 305, a tone is generated.

When the fourth bit stream y(n) is fed to a CPM generator, e.g. to the CPM signal generating module 305, the generated signal is spectrally concentrated around a definite frequency, as a result of Action 204. The phase of the generated signal is shifted according to a phase shift sequence determined by the first bit stream d(n), e.g. d(n)=0 then the phase is 0 degrees and d(n)=1 results in a phase of 180 degrees. Hence a BPSK signal is generated, and has a frequency and signalling rate compatible with the signalling rate and subcarrier frequencies used by the second network node 104, in such a way that the generated signal may be received by an OFDM receiver comprised in the second network node 104.

In some first embodiments, the first network node 102 may generate the fourth bit stream y(n) from the third bit stream x(n) in dependence of the second bit stream b(n) of data for transmission by expanding the third bit stream x(n) by the predetermined factor M further comprises generating the fourth bit stream y(n) to comprise all bit values of the third bit stream x(n) and by inserting M−1 bits equal to 0 after each bit value from the third bit stream x(n).

In some second embodiments, the first network node 102 may generate the fourth bit stream y(n) from the third bit stream x(n) in dependence of the second bit stream b(n) of data for transmission by expanding the third bit stream x(n) by the predetermined factor M further comprises generating the fourth bit stream y(n) from the third bit stream x(n) in dependence of a second bit stream b(n) of data for transmission and by expanding the third bit stream x(n) by the predetermined factor M.

In such second embodiments, the first network node 102 may generate the fourth bit stream y(n) from the third bit stream x(n) in dependence of the second bit stream b(n) of data for transmission by expanding the third bit stream x(n) by the predetermined factor M by further comprising:

generating the fourth bit stream y(n) to comprise all bit values of the third bit stream x(n);

inserting M−1 bits equal to 0 after each bit value from the third bit stream x(n) when the bit value of the second bit stream b(n) is 0; and inserting M−1 bits equal to 1 after each bit value from the third bit stream x(n) when the bit value of the second bit stream b(n) is 1.

Action 205

By means of a CPM signal generating module 305 comprised in the first network node 102, the first network node 102 generates a BPSK signal based on the fourth bit stream (y). The CPM signal generating module 305 may be a CPM signal generator or a CPM modulator.

In some second embodiments, the BPSK signal generated based on the fourth bit stream y(n) is a BPSK and FSK signal, sometimes herein referred to as a BPSK-FSK signal.

Action 206

The first network node 102 transmits the BPSK signal to an OFDM, signal receiving module 301a of the second network node 104.

Upon reception of the BPSK signal, the second network node 104 may perform one or more operations such as equalization, demodulation and decoding, on the received BPSK signal.

Figure 3:
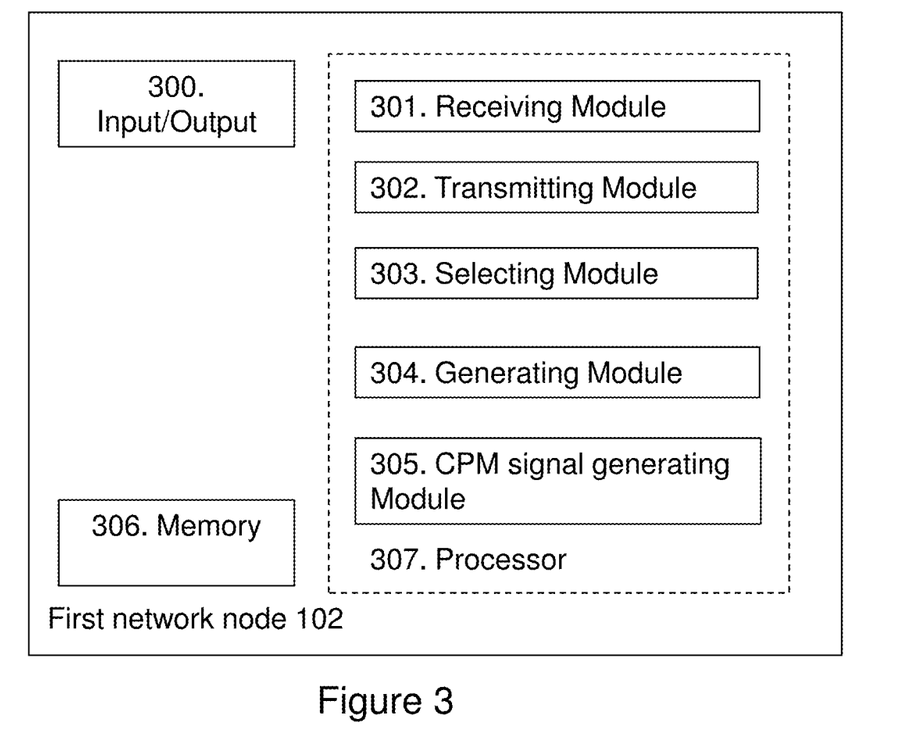
FIG. 3 is a block diagram schematically illustrating embodiments of a first network node.

To perform the method for generation and transmission of a BPSK signal to the second network node 104, the first network node 102 may be configured according to an arrangement depicted in FIG. 3. As previously mentioned, the first network node 102 and the second network node 104 are configured to operate in the wireless communications network 100.

Furthermore, as previously mentioned, the first network node 102 is capable of generating a CPM signal with a modulation index h=0.5 and a bit period $T_{CPM}$.

The first network node 102 comprises an input and output interface 300 configured to communicate, with one or more wireless devices or with one or more other network nodes, e.g. the second network node 104 operating in the wireless communications network 100. The input and output interface 300 may comprise a wireless receiver (not shown) and a wireless transmitter (not shown).

The first network node 102 is configured to receive, e.g. by means of a receiving module 301 configured to receive, a transmission from one or more wireless devices or from one or more other network nodes, e.g. the second network node 104. The receiving module 301 may be implemented by or arranged in communication with the processor 307 of the first network node 102.

The first network node 102 is configured to transmit, e.g. by means of a transmitting module 302 configured to transmit, a transmission to one or more wireless devices or to one or more other network nodes, e.g. the second network node 104. The transmitting module 302 may be implemented by or arranged in communication with the processor 307 of the first network node 102.

The first network node 102 is configured to transmit a BPSK signal to an OFDM signal receiving module (not shown) of the second network node 104.

The first network node 102 is configured to select, e.g. by means of a selecting module 303 configured to select, a bit period $T_{CPM}$. The selecting module 303 may be implemented by or arranged in communication with the processor 307 of the first network node 102.

The first network node 102 may be configured to select the bit period $T_{CPM}$ such that the predetermined factor M multiplied with the bit period $T_{CPM}$ is equal to a time duration of one OFDM symbol $T_{OFDM}$ plus a time duration of a cyclic prefix $T_{CP}$.

In some first embodiments, the first network node 102 may be configured to select a first centre of frequency of the first network node 102 to be separated by a predetermined number of frequency units from a second centre of frequency of a subcarrier in of one of the OFDM subcarriers used by the second network node 104.

The predetermined number of frequency units results in a frequency separation between the first and second centres that is equal to a maximum frequency deviation of signals generated by a CPM signal generating module 305 (to be described below).

The maximum frequency deviation of the BPSK signal may be equal to a frequency spacing between two OFDM signals.

In some second embodiments, the first network node 102 may be configured to select a first centre of frequency of the first network node 102 to coincide with a second centre of frequency of a subcarrier in of one of the OFDM subcarriers used by the second network node 104.

The first network node 102 is configured to generate, e.g. by means of a generating module 304 configured to generate, a bit stream from an input bit stream.

The generating module 304 may be implemented by or arranged in communication with the processor 307 of the first network node 102.

The first network node 102 is configured to generate a third bit stream x(n) from a first bit stream d(n) of data for transmission, wherein each output bit comprised in the third bit stream x(n) depends on a transition in bit values between two input bits from the first bit stream d(n).

Further, the first network node 102 is configured to generate a fourth bit stream y(n) from the third bit stream x(n) by expanding the third bit stream x(n) by a predetermined factor M.

In some embodiments, the first network node 102 is configured to generate the third bit stream x(n) from the first bit stream d(n) by being configured to:
  assign an output bit of the third bit stream x(n) a first value when there is no transition in bit values between a first input bit and a second input bit from the first bit stream d(n), and
  assign the output bit of the third bit stream x(n) a second value when there is a transition in bit values between the first input bit and the second input bit, wherein the first and second input bits are consecutive input bits, and wherein one of the first and second values is 1 and the other one of the first and second values is 0.

Alternatively, the first network node 102 may be configured to generate the third bit stream x(n) from the first bit stream x(n) by being configured to differentially encode the first bit stream d(n) to generate the third bit stream x(n).

In some first embodiments, the first network node 102 may be configured to generate of the fourth bit stream y(n) from the third bit stream x(n) by expanding the third bit stream x(n) by the predetermined factor M by being configured to generate the fourth bit stream y(n) to comprise all bit values of the third bit stream x(n); and to insert M−1 bits equal to 0 after each bit value from the third bit stream x(n).

In some second embodiments, the first network node 102 may be configured to generate the fourth bit stream y(n) from the third bit stream x(n) by expanding the third bit stream x(n) by the predetermined factor M by being configured to:
  generate the fourth bit stream y(n) from the third bit stream x(n) in dependence of a second bit stream b(n) of data for transmission and by expanding the third bit stream x(n) by the predetermined factor M; and
  wherein the BPSK signal generated based on the fourth bit stream y(n) is a BPSK-FSK signal.

Further, the first network node 102 may be configured to generate the fourth bit stream y(n) from the third bit stream x(n) in dependence of the second bit stream b(n) of data for transmission and by expanding the third bit stream x(n) by the predetermined factor M by being configured to:
  generate the fourth bit stream y(n) to comprise all bit values of the third bit stream x(n);
  insert M−1 bits equal to 0 after each bit value from the third bit stream x(n) when the bit value of the second bit stream b(n) is 0; and
  insert M−1 bits equal to 1 after each bit value from the third bit stream x(n) when the bit value of the second bit stream b(n) is 1.

The first network node 102 is configured to generate, e.g. by means of a CPM generating module 305 configured to generate, a BPSK signal. The CPM generating module 305 may be implemented by or arranged in communication with the processor 307 of the first network node 102.

The first network node 102 is configured to generate a BPSK signal based on the fourth bit stream y(n).

The CPM generating module 305 may sometimes be referred to as a CPM signal generator or a CPM modulator.

The CPM generating module 305 may be a GMSK modulator, a Minimum Shift Keying (MSK) modulator or a GFSK modulator, just to give some further examples.

The first network node 102 may also comprise means for storing data. In some embodiments, the first network node 102 comprises a memory 306 configured to store the data. The data may be processed or non-processed data and/or information relating thereto. The memory 306 may comprise one or more memory units. Further, the memory 306 may be a computer data storage or a semiconductor memory such as a computer memory, a read-only memory, a volatile memory or a non-volatile memory. The memory is arranged to be used to store obtained information, data, configurations, scheduling algorithms, and applications etc. to perform the methods herein when being executed in the first network node 102.

Embodiments herein for generation and transmission of a BPSK signal to the second network node 104 may be implemented through one or more processors, such as the processor 307 in the arrangement depicted in FIG. 3, together with computer program code for performing the functions and/or method actions of embodiments herein. The program code mentioned above may also be provided as a computer program product, for instance in the form of a data carrier carrying computer program code for performing the embodiments herein when being loaded into the first network node 206. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first network node 102.

Those skilled in the art will also appreciate that the input/output interface 300, the receiving module 301, the transmitting module 302, the selecting module 303, the generating module 304 and the CPM signal generating module 305 above may refer to a combination of analog and digital circuits, and/or one or more processors configured with software and/or firmware, e.g. stored in the memory 306, that when executed by the one or more processors such as the processors in the first network node 102 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Generation of a BPSK Signal by Means of a CPM Modulator

This section relates to Actions 203-205 described above and it is shown that when certain bit patterns are fed to a continuous phase modulator, e.g. the CPM signal generating module 305, with a modulation index h=0.5, it is possible to generate a BPSK signal.

It is necessary to look in some detail into the generation of CPM signals in order to understand embodiments described in this disclosure.

For simplicity, consider a Minimum Shift Keying (MSK) signal. The input to the CPM modulator, e.g. the CPM signal generating module 305, is a sequence of bits ($c_n$), e.g. the fourth bit stream y(n) mentioned above, which bits are first mapped to binary symbols according to the expression $a_n = 1 - 2c_n$, $a_n \in \{-1, 1\}$. Given a bit period of time $T_{CPM}$ [s], the phase φ at a point of time t is given by $$\varphi(t; (a_m)) = \frac{\pi}{2} \sum_{k \leq n-1} a_k + a_n \frac{\pi(t - nT_{CPM})}{2T_{CPM}},$$

$$nT_{CPM} \leq t \leq (n+1)T_{CPM}.$$

It should be noted that that the dependence of the phase on the binary symbols is made explicit in the notation φ(t; ($a_m$)). Writing $$\theta_n = \frac{\pi}{2} \sum_{k \leq n-1} a_k,$$

the phase may be written in the form $$\varphi(t; (a_m)) = \theta_n + a_n \frac{\pi(t - nT_{CPM})}{2T_{CPM}}.$$

The modulated RF carrier, having a centre frequency $f_c$, e.g. the first centre frequency mentioned above, is $$\cos(2\pi f_c t + \varphi(t;(a_m)))$$

Observe that $$\varphi(nT_{CPM};(a_m)) = \theta_n.$$

Consider now a sequence of binary symbols $a_k$ and consider the relative phase changes when the polarity of one of the symbols $a_n$ is changed but all others are kept fixed. The notation φ(t; ($a_m$)|$a_n$=A) indicates the phase φ(t; ($a_m$)) conditioned on the value of the n-th binary symbol $a_n$ to be equal to a fixed quantity A. Next, consider the difference between the phases of CPM signals whose input differs only in one symbol:

$$\Delta\varphi(-1 \to +1)$$
$$= \varphi((n+m)T_{CPM}; (a_m) | a_n = 1)$$
$$- \varphi((n+m)T_{CPM}; (a_m) | a_n = -1)$$
$$\Delta\varphi = \left(\theta_n + \frac{\pi}{2} \cdot 1 + \frac{\pi}{2} a_{n+1} + \ldots + \frac{\pi}{2} a_{n+m}\right)$$
$$- \left(\theta_n + \frac{\pi}{2} \cdot (-1) + \frac{\pi}{2} a_{n+1} + \ldots \right.$$
$$\left. + \frac{\pi}{2} a_{n+m}\right)$$

Thus, it is noted that $$\Delta\varphi = \begin{cases} \pi & \text{if } m > 0 \\ 0 & \text{otherwise} \end{cases}.$$

Similarly $$\Delta\varphi(+1 \to -1) =$$
$$\varphi((n+m)T_{CPM}; (a_m) | a_n = -1) - \varphi((n+m)T_{CPM}; (a_m) | a_n = 1) =$$
$$\begin{cases} -\pi & \text{if } m > 0 \\ 0 & \text{otherwise} \end{cases}.$$

This is the basic principle that allows the generation of a BPSK signal using a CPM signal modulator, e.g. the CPM signal generating module 305.

The BPSK signalling rate is a design factor since the BPSK signalling rate may be expressed as $1/(M*T_{CPM})$ wherein M is a positive integer to be selected and $T_{CMP}$ is a bit period. A BPSK symbol duration is then of the form $M*T_{CPM}$ where M is a positive integer and $T_{CPM}$ is the bit period, sometimes referred to as a symbol duration, of the CPM signals. Suppose that a sequence of BPSK symbols ($B_k$) taking on the values +1 or −1, is given, and it is desired to produce a waveform modulated using this BPSK constellation symbols. Without loss of generality, assume that $B_0=1$ Firstly, the BPSK symbols $B_k$ are differentially encoded. The reason is that using a CPM waveform generator, e.g. the CPM signal generating module 305, it is only possible to change the phase at some instant $\theta_n$ relative to the previous phase $\theta_{n-1}$. The differential encoding process captures the phase changes in the sequence $B_k$. Moreover, it is information lossless. That is, the differentially encoded symbols comprises exactly the same information as the original symbols. The mathematical expression for the differentially encoded symbols $C_k$ is $$C_k = \begin{cases} B_k & \text{if } k = 0 \\ B_k \cdot B_{k-1} & \text{otherwise} \end{cases}.$$

The sequence $C_k$ is also binary, and captures changes in the polarity of successive symbols $B_{k-1}$, $B_k$.

Secondly, start with a constant input sequence of binary symbols am consisting of ones: $\alpha_m=1$, m=1, . . . , N. The phase $\varphi(t; (a_m))$ gives rise to a pure tone.

Thirdly, generate a second sequence $\beta_m$ which is identical to $\alpha_m$, with the possible exception of the M-th entry:

$$\beta_m = \begin{cases} \alpha_m & \text{if } m \neq M \\ \alpha_m & \text{if } m = M \text{ and } C_1 = 1 \\ -\alpha_m & \text{if } m = M \text{ and } C_1 = -1 \end{cases}.$$

As shown above, $\varphi(t; (\beta_m))$ introduces a phase shift by $\pi$ radians after time $M \cdot T_{CPM}$ whenever there is a change in the polarity of the symbols between $B_0$ and $B_1$.

Fourthly, generate a third sequence $\gamma_m$ which is identical to $\beta_m$, with the possible exception of the 2*M-th entry:

$$\gamma_m = \begin{cases} \beta_m & \text{if } m \neq 2M \\ \beta_m & \text{if } m = 2M \text{ and } C_2 = 1 \\ -\beta_m & \text{if } m = 2M \text{ and } C_2 = -1 \end{cases}.$$

As shown above, $\varphi(t; (\gamma_m))$ introduces a phase shift by $\pi$ radians after time $2 \cdot M \cdot T_{CPM}$ whenever there is a change in the polarity of the symbols between B1 and $B_2$.

Fifthly, generate a fourth sequence $\beta_m$ which is identical to $\gamma_m$, with the possible exception of the 3*M-th entry:

$$\delta_m = \begin{cases} \gamma_m & \text{if } m \neq 3M \\ \gamma_m & \text{if } m = 3M \text{ and } C_3 = 1 \\ -\gamma_m & \text{if } m = 3M \text{ and } C_3 = -1 \end{cases}.$$

As shown above, $\varphi(t; (\delta_m))$ introduces a phase shift by $\pi$ radians after time $3 \cdot M \cdot T_{CPM}$ whenever there is a change in the polarity of the symbols between $B_2$ and $B_3$.

The process continues in the same fashion until there are no more symbols $C_k$ available. The final sequence has the following form:

$$\omega_k = \begin{cases} 1 & \text{if } k \neq n \text{ for some integer } n \\ 1 & \text{if } k = nM \text{ for some integer } n \text{ and } C_k = 0 \\ -1 & \text{if } k = nM \text{ for some integer } n \text{ and } C_k = 1 \end{cases}$$

By looking at the resulting phase function it is evident that the process generates pure tones in the time intervals $(kM+1)T_{CPM} \leq t \leq (k+1)MT_{CPM}$, since the phase changes at a constant rate during these time intervals. During the initial period of duration $T_{CPM}$ in a signaling period of duration $MT_{CPM}$ there may be transients due to the changes of polarity in the underlying BPSK signal and the CPM signal is not a pure tone. It is possible to employ any CPM waveforms, such as GMSK or GFSK with modulation index h=0.5. The only difference is that the transient period may last longer than $T_{CPM}$ due to the memory inherent in some modulation schemes such as GMSK.

The explanation above has been given in terms of BPSK symbols. However, since there is a 1-1 mapping between bits and binary symbols, it is possible to cast the method described above in terms of bit streams. Both descriptions are equivalent. Concretely, the BPSK sequence $B_k$ is replaced by a binary sequence $\Theta_k$, on which differential encoding is performed to produce the differentially encoded bit stream $\Gamma_k$:

$$\Gamma_k = \begin{cases} \theta_k & \text{if } k = 0 \\ \theta_k \oplus \theta_{k-1} & \text{otherwise} \end{cases},$$

where $\oplus$ denotes addition modulo 2. Define the bit stream $\Omega_k$ by $$\Omega_k = \begin{cases} 0 & \text{if } k \neq n \text{ for some integer } n \\ 0 & \text{if } k = nM \text{ for some integer } n \text{ and } \Gamma_k = 0 \\ 1 & \text{if } k = nM \text{ for some integer } n \text{ and } \Gamma_k = 1 \end{cases}.$$

When the sequence $\Omega_k$ is fed to a CPM waveform generator, the resulting waveform is identical to the CPM waveform having the phase $\varphi(t; (\omega_m))$.

When an input bit stream consisting only of zeros (or only of ones) is fed to a modulator capable of generating CPM waveforms with modulation index h=0.5, the resulting waveform is a pure tone with a frequency separated by a distance $(\frac{1}{4}T_{CPM})$ Hz from the center of frequency $f_c$. Hence, when generating BPSK symbols using a CPM signal generator e.g. the CPM signal generating module 305, and the technique disclosed above, the transmitter, e.g. the first network node 102, should consider the fact that the center of frequency of the generated BPSK tone is shifted by $(\frac{1}{4}T_{CPM})$ Hz from the center of frequency of the RF carrier.

In summary, it has been shown how to generate a BPSK signal by means of a CPM signal generator. The generation has been made at a rate slower than the bit rate of the CPM signals by a factor M. The description has been based on an underlying MSK signal, but the same procedure may be applied to CPM signals with modulation index h=0.5.

Expansion and Signed Expansion of Digital Signals

Expansion, also called upsampling, is a basic operation in digital signal processing. Given an input digital signal x(n) and an expansion factor M, the expanded signal is generated by inserting M−1 zeros between adjacent input samples. The expanded signal $$\begin{cases} x\left(\dfrac{n}{M}\right) & \text{if } n \text{ is a multiple of } M \\ 0 & \text{otherwise} \end{cases}$$

is often denoted $[x(n)]_{\uparrow M}$. As an illustration, the first terms of the expanded digital signal are $$\left\{ x(0), \underbrace{0, \ldots, 0}_{M-1 \text{ zeros}}, x(1), \underbrace{0, \ldots, 0}_{M-1 \text{ zeros}}, x(2), 0, \ldots \right\}$$

In some embodiments disclosed herein, e.g. in some second embodiments, a concept called signed expansion is introduced and generalizes the notion of expansion. Suppose that a bit stream b(n) is also given. The signed expansion process comprises insertion of either M−1 zeros (0) or M−1 ones (1) between the input samples, depending on the value of the bits b(n). The signed expansion is denoted by $[x(n); b]_{\uparrow M}$ to emphasize the dependence on the bit sequence b(n) It is given by $$\begin{cases} x\left(\dfrac{n}{M}\right) & \text{if } n = kM \text{ for some integer } k \\ 0 & \text{if } kM < n < (k+1)M \text{ and } b(k) = 0 \\ 1 & \text{if } kM < n < (k+1)M \text{ and } b(k) = 1 \end{cases}$$

$[x(n); b]_{\uparrow M}$ is called the signed expansion of x(n) depending on b(n).

For example, if b(0)=0, b(1)=1 and b(2)=0 then the first terms in the signed expansion of x(n) depending on b(n) are $$\left\{ x(0), \underbrace{0, \ldots, 0}_{(M-1)\text{0s}, b(0)=0}, x(1), \underbrace{1, \ldots, 1}_{(M-1)\text{1s}, b(1)=1}, x(2), \underbrace{0, \ldots, 0}_{(M-1)\text{0s}, b(2)=0}, x(3), \ldots \right\}$$

Some Exemplifying Embodiments

Some First Exemplifying Embodiments

In some first exemplifying embodiments, a CPM signal generator, e.g. the CPM signal generating module 305, is used to generate one or more single carrier BPSK signals that may be transmitted from a transmitter, e.g. the first network node 102, and successfully received by an OFDM receiver, e.g. a receiver of the second network node 104. Such method may be useful in IoT scenarios where low power IoT wireless devices, e.g. several first network nodes 102, based on the Bluetooth hardware or the IEEE 802.15.4 hardware, are scheduled for concurrent uplink transmission in an FDMA fashion, and scheduled to transmit the BPSK signals to an OFDMA receiver, e.g. the second network node 104 such as an enhanced IEEE 802.11ax AP. The part of the generated signal which is not a pure BPSK signal (see the Section "Generation of BPSK signal by means of CPM modulator" above) is placed in the cyclic prefix. In this way the performance degradation relative to a BPSK signal generated using a BPSK signal generator, such as an OFDM transmitter, is kept to a minimum.

Some embodiments herein is implemented in a first network node 102 capable of generating CPM signals with a modulation index h=0.5 and a bit period $T_{CPM}$ [s]. The purpose is to generate BPSK signals that may be received by a remote network node, e.g. a second network node 102 capable of receiving OFDM signals with a symbol time duration $T_{OFDM}$ [s] and a cyclic prefix time duration $T_{CP}$ [s]. A nominal bit period $T_{CPM}$ may be chosen such that M bit periods match the time duration of one OFDM symbol plus the cyclic prefix time duration. That is, $M \cdot T_{CPM} = (T_{OFDM} + T_{CP})$)

In some embodiments described herein the first network node 102 firstly has or receives a first bit stream of data d(n) for transmission. Typically, this bit stream is a physical layer Protocol Data Unit (PDU).

Secondly, the first network node 102 differentially encodes the first bit stream d(n) to generate a third bit stream x(n). The differential encoder, e.g. the generating module 304, is as described in the Section "Generation of BPSK signal by means of CPM modulator" above. The purpose of the differential encoder is to detect changes in the bit polarity between successive pairs of input bits d(n) and is given by the formula x(n)=d(n)⊕d(n−1). This relates to e.g. Action 203 described above.

Thirdly, the first network node 102 generates, e.g. by means of the generating module 304, a fourth bit stream y(n) from the third bit stream by expanding the third bit stream by a factor, e.g. a predetermined factor, M. Utilizing the notation introduced in the Section "Generation of BPSK signal by means of CPM modulator" above, the fourth bit stream $y(n)=[x(n)]_{\uparrow M}$.

Fourthly, the fourth bit stream is fed to a CPM signal generator, e.g. e.g. the CPM signal generating module 305, such as a GMSK modulator, an MSK modulator or a GFSK modulator, to produce a BPSK signal.

Optionally, the first network node 102 may select the center of frequency of the first network node 102 to be separated by $(\frac{1}{4}T_{CPM})$ Hz from the center of frequency of some subcarrier in the OFDM channel raster used by the remote node, e.g. the second network node 104.

Fifthly, the first network node 102 transmits the BPSK signal to the remote node, e.g. the second network node 104.

Example Relating to Some First Exemplifying Embodiments

In this example it is shown how the first network node 102 generates a single BPSK signal that may be received by the second network node 104 using an OFDM receiver.

The first network node 102 may be an IoT wireless device based on a Bluetooth Low Energy chipset and using a GFSK with modulation index h=0.5, and the second network node 104 may be an IEEE 802.11ax AP.

Thus, the transmitting node, e.g. the first network node 102 is a BLE-like transmitter. By BLE-like transmitter means that a BLE chipset is used but some of the firmware has been modified in order to implement the Actions 203 and 204 of the some embodiments described herein. Further, the first network node 102 is configured to perform GFSK with a modulation index h=0.5, to generate a bit rate 1 Mbps, and to have a bit time period $T_{CPM}=1$ μs.

The receiving node, e.g. the second network node 104 is an IEEE 802.11ax-like receiver. The nominal sampling rate is 20 MHz, and the FFT size is 256. The cyclic prefix duration is $T_{CP}$=3.2 is. With this numerology, one OFDM symbol has a duration $T_{OFDM}$=12.8 is and therefore $16 \cdot T_{CPM}=(T_{OFDM}+T_{CP})$. The subcarrier spacing is 20 MHz/ 256=78125 Hz.

Firstly, suppose that data for transmission to the second network node 104 comprises the first bit stream d(n) given by [0,0,1,0,1,0]

Secondly, the differentially encoded bit stream x(n)=d(n)⊕d(n−1) is generated, as illustrated in Table 1.

TABLE 1

Input bit stream and differentially encoded bit stream.

| k | 0 | 1 | 2 | 3 | 4 | 5 |
|---|---|---|---|---|---|---|
| Input bit d(k) | 0 | 0 | 1 | 0 | 1 | 0 |
| x(k): mark transition in bit value from d(k − 1) → d(k) | 0 | 0 | 1 | 1 | 1 | 1 |

Hence, the third bit stream x(n) is obtained as: [0,0,1,1,1,1]

Thirdly, expansion by a factor M=16 is applied, giving the expanded bit stream $[x(n)]_{\uparrow 16}$.
[0,0,0,0,0,0,0,0,0,0,0,0,0,0,0,0,0,0,0,0,0,0,0,0,0,0,0,0,0,0,0,0, 0,1,0,0,0,0,0,0,0,0,0,0,0,0,0,0,1,0,0,0,0,0,0,0,0,0,0,0,0,0,0,0, 0,1,0,0,0,0,0,0,0,0,0,0,0,0,0,0,1,0,0,0,0,0,0,0,0,0,0,0,0,0,0,0, 0, The bits prior to expansion have been highlighted in bold for illustration purposes only. This expanded bit stream $[x(n)]_{\uparrow 16}$ is then fed to the CPM modulator 305 in the first network node 102 and a BPSK signal is generated.

Fourthly, the first network node 102 positions its center of frequency at a separation of 250 kHz from the center of frequency of some predetermined subcarrier in the OFDM receiver in the second network node 104.

Fifthly, the first network node 102 transmits the BPSK signal to a remote node, e.g. to the second network node 104.

The remote node, e.g. the second network node 104 performs removal of the cyclic prefix followed by a FFT, and demodulates the frequency signal in the predetermined subcarrier as a BPSK signal.

Figure 4:
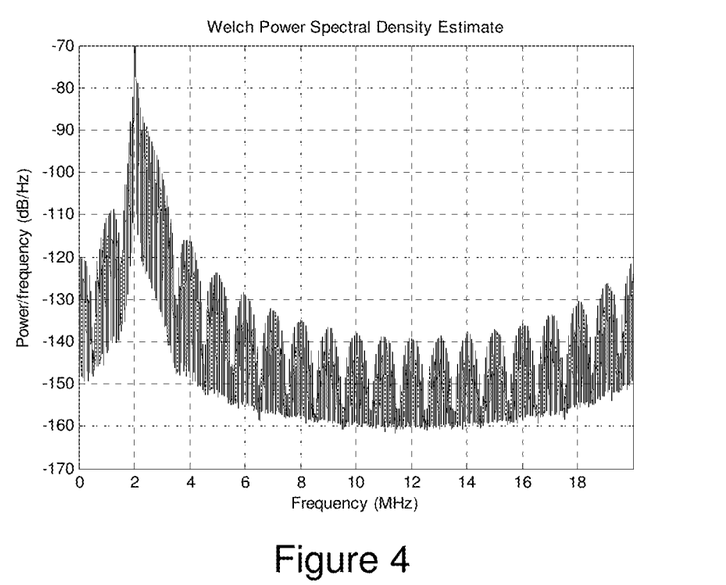
FIG. 4 schematically illustrates the power spectrum density of a transmitted BPSK signal.

FIG. 4 schematically illustrates the power spectrum of the transmitted BPSK signal. The centre of frequency is 27*78125=2109375 Hz.

FIG. 5 schematically illustrates a constellation diagram (an I/Q diagram) of received signal after equalization. In other words FIG. 5 shows an I/Q diagram of received signal after equalization, using an OFDM receiver, e.g. the second network node 104, and extracting subcarrier number 27, cf. FIG. 4. The BPSK symbols are shown. A sampling offset of 16 samples means that the time synchronization deviates from the ideal sampling position by 16 samples, taken at a rate of 20 MHz. The cyclic prefix consists of 64 samples at this rate.

Some Second Exemplifying Embodiments

In some second exemplifying embodiments, signaling at a rate potentially higher than that of some first exemplifying embodiments is disclosed. The method to generate BPSK signals by means of the CPM signal generator as described in relations to Action 203-205 above and in the section "Generation of BPSK signal by means of CPM modulator" above is combined with the signed expansion method described in the section "Expansion and signed expansion of digital signals" above. In this way it is possible to generate BPSK-FSK signals that may be received by an OFDM receiver comprised in the second network node 104. In this case the OFDM receiver utilizes two or more subcarriers to successfully decode the received BPSK signal. Both the phase position, i.e. the BPSK, and the tone position, i.e. the FSK, carry information, so that 2 bits may be signaled in one signaling period.

Embodiments of this method is useful in IoT scenarios wherein low power IoT wireless devices based on Bluetooth hardware or IEEE 802.15.4 hardware are scheduled for concurrent uplink transmission in an OFDMA fashion, and wherein the low power IoT wireless devices transmit the uplink transmissions to an OFDMA receiver of the second network node 104, such as an enhanced 802.11ax AP. The part of the generated signal which is not a pure BPSK signal (as described in the section "Generation of BPSK signal by means of CPM modulator") is placed in the cyclic prefix. In this way the performance degradation relative to a BPSK signal generated using an OFDM transmitter is kept to a minimum.

Some embodiments are implemented in the first network node 102 being capable of generating CPM signals with a modulation index H=0.5 and a bit duration $T_{CPM}$ [s]. A purpose of the method is to generate BPSK signals that may be received by a remote radio node, e.g. the second network node 104 that is capable of receiving OFDM signals with a symbol time duration $T_{OFDM}$ [s] and a cyclic prefix time duration $T_{CP}$ [s]. The nominal bit period of time $T_{CPM}$ is chosen such that M bit periods match the time duration of one OFDM symbol plus the cyclic prefix time duration. That is, $$M \cdot T_{CPM}=(T_{OFDM}+T_{CP}))$$

Firstly, the first network node 102 has or receives a first bit stream d(n) of data for transmission and a second bit stream b(n) of data for transmission. Typically, these bit streams comprise a physical layer PDU.

Secondly, the first network node 102 differentially encodes the first bit stream d(n) to generate a third bit stream x(n) The differential encoder is as described in the section "Generation of BPSK signal by means of CPM modulator" above. The purpose of the differential encoder is to detect changes in the bit polarity between successive pairs of input bits d(n) and is given by the formula x(n)=d(n)⊕d(n−1).

Thirdly, a fourth bit stream y(n) is generated from the second bit stream by signed expansion by a factor M, depending on the second bit stream b(n) of the third bit stream x(n). Utilizing the notation introduced in the section "Generation of BPSK signal by means of CPM modulator" above, the third bit stream $y(n)=[x(n); b]_{\uparrow M}$.

Fourthly, the fourth bit stream is fed to a CPM signal generator, e.g. the CPM signal generating module 305 to produce a BPSK-FSK signal.

Optionally, the first network node 102 selects the center of frequency of the transmitter, e.g. the first network node 102, to coincide with the center of frequency of some subcarrier in the OFDM channel raster used by the remote node, e.g. the second network node 104.

Fifthly, the first network node 102 transmits the BPSK-FSK signal to the remote node, e.g. the second network node 104. This transmitted BPSK-FSK signal is sometimes herein referred to just BPSK signal.

Example Relating to Some Second Exemplifying Embodiments

The first network node 102 may be an IoT wireless device based on a chipset supporting GFSK with modulation index h=0.5, and the second network node 104 may be an IEEE 802.11ax AP.

Further, the first network node 102 is capable of generating GMSK with modulation index h=0.5, bit rate 15/16 Mbps, and bit period $$T_{CPM} = \frac{16}{15} \mu s.$$

Furthermore the second network node 104 is a 802.11ax-like AP. The nominal sampling rate is 20 MHz, and the FFT size is 256. The cyclic prefix duration is $T_{CP}$=3.2 μs. With this numerology, one OFDM symbol has a duration $T_{OFDM}$=12.8 μs and therefore $15 \cdot T_{CPM}=(T_{OFDM}+T_{CP})$. The subcarrier spacing is 20 MHz/256=78125 Hz. Suppose that data for transmission to the second network node 104 consists of the same bit stream d(n) [0,0,1,0,1,0] used in the example relating to some first exemplifying embodiments above. In addition, it is desired to transmit to the remote node, e.g. the second network node 104, a second bit stream b(n) given by [0,1,1,1,0,0].

A third bit stream x(n) is generated by differential encoding, exactly as in the previous example relating to some first exemplifying embodiments above, [0,0,1,1,1,1]

Using an expansion factor N=15, the signed expansion [x(n); b]↑15 of the third bit stream x(n) dependent on the second bit stream b(n) is generated:
[0,0,0,0,0,0,0,0,0,0,0,0,0,0,0,1,1,1,1,1,1,1,1,1,1,1,1,1,1,1, 1,1,1,1,1,1,1,1,1,1,1,1,1,1,1,1,1,1,1,1,1,1,1,1,1,1,1,0,0,0, 0,0,0,0,0,0,0,0,0,0,0,1,0,0,0,0,0,0,0,0,0,0,0,0,0,0,0]

The bits prior to expansion have been highlighted in bold for illustration purposes only.

This expanded bit stream [x(n)]↑15 is then fed to the modulator, e.g. the CPM signal generating module 305, in the first network node 102. The first network node 102 positions its center of frequency at the center of frequency of some predetermined subcarrier in the OFDM receiver of the second network node 104 and transmits to the remote node, e.g. the second network node 104. This generates two tones having a separation of $$\frac{1}{4T_{CPM}} = 234135 \text{ Hz}$$

from the center of frequency. That is exactly 3 times the subcarrier spacing in the OFDM receiver: 234135/3=78125.

The first network node 102 transmits the BPSK-FSK signal to the remote node, e.g. to the second network node 104.

The second network node 104 performs CP removal followed by FFT, and demodulates the frequency signal in the predetermined subcarrier as a BPSK signal. This gives estimates of the first bit stream d(n). In addition, the second network node 104 detects the presence or absence of tones centered at ±234135 Hz from the center of frequency of the transmitted BPSK-FSK signal. This gives estimates of the second bit stream b(n).

FIG. 6 schematically illustrates the power spectrum of the transmitted BPSK-FSK signal. The two main tones have frequencies 36*78125=2812500 Hz and 42*78125=3281250 Hz.

Figure 7:
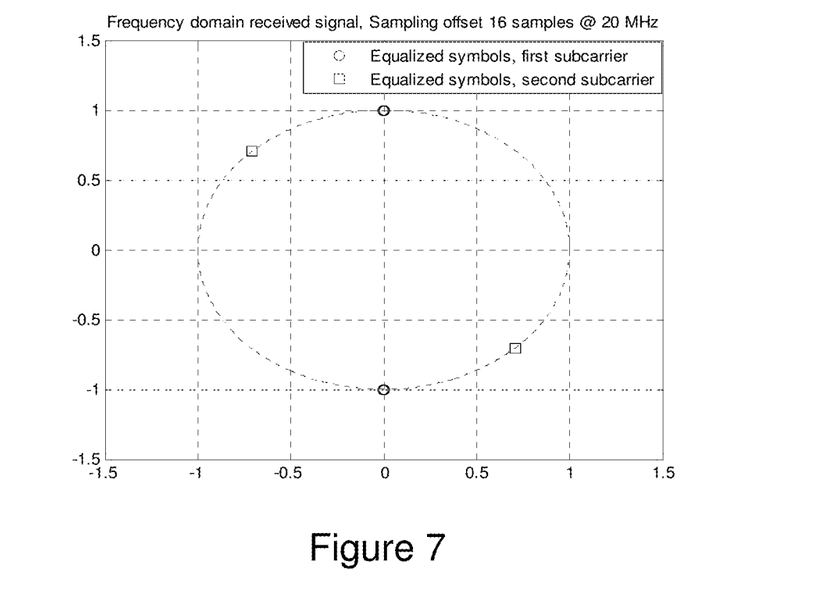
FIG. 7 schematically illustrates a constellation diagram (an I/Q diagram) of received signal after equalization.

FIG. 7 schematically illustrates a constellation diagram (an I/Q diagram) of received signal after equalization. The equalization is performed by the OFDM receiver of the second network node 104. Further, tow subcarriers are extracted by the second network node 104. The BPSK symbols are shown. A sampling offset of 16 samples means that the time synchronization deviates from the ideal sampling position by 16 samples, taken at a rate of 20 MHz. The cyclic prefix consists of 64 samples at this rate. The FSK is not shown.

When using the word "comprise" or "comprising" it shall be interpreted as non-limiting, i.e. meaning "consist at least of". Further, the word "a" or "an" should be understood to refer to "at least one" or to "one or more" if not explicitly stated that it refers to a "single" entity.

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a first network node for generation and transmission of a Binary Phase Shift Keying, BPSK, signal to a second network node, wherein the first and second network nodes are operating in a communications network, and wherein the method comprises:
   generating a third bit stream x(n) from a first bit stream d(n) of data for transmission, wherein each output bit comprised in the third bit stream x(n) depends on a transition in bit values between two input bits from the first bit stream d(n);
   generating a fourth bit stream y(n) from the third bit stream x(n) by expanding the third bit stream x(n) by a predetermined factor M,
   wherein the predetermined factor M is a non-zero positive integer;
      by means of a Continuous Phase Modulation, CPM, signal generating circuit comprised in the first network node, generating a BPSK signal based on the fourth bit stream y(n); and
      transmitting the BPSK signal to an Orthogonal Frequency Division Multiplexing, OFDM, signal receiving circuit of the second network node.

2. The method of claim 1, wherein the generating of the third bit stream x(n) from the first bit stream d(n) comprises:
   assigning an output bit of the third bit stream x(n) a first value when there is no transition in bit values between a first input bit and a second input bit from the first bit stream d(n), and
   assigning the output bit of the third bit stream x(n) a second value when there is a transition in bit values between the first input bit and the second input bit, wherein the first and second input bits are consecutive input bits, and wherein one of the first and second values is 1 and the other one of the first and second values is 0.

3. The method of claim 1, wherein the generating of the third bit stream x(n) from the first bit stream d(n) comprises:

differentially encoding the first bit stream d(n) to generate the third bit stream x(n).

4. The method of claim 1, wherein the generating of the fourth bit stream y(n) from the third bit stream x(n) by expanding the third bit stream x(n) by the predetermined factor M comprises:
generating the fourth bit stream y(n) to comprise all bit values of the third bit stream x(n); and
inserting M−1 bits equal to 0 after each bit value from the third bit stream x(n).

5. The method of claim 1, further comprising:
selecting a first centre frequency of the first network node to be separated by a predetermined number of frequency units from a second centre frequency of a subcarrier in of one of the OFDM subcarriers used by the second network node.

6. The method of claim 5, wherein the predetermined number of frequency units results in a frequency separation between the first and second centre frequencies that is equal to a maximum frequency deviation of signals generated by the CPM signal generating circuit.

7. The method of claim 6, wherein the maximum frequency deviation of the BPSK signal is equal to a frequency spacing between two OFDM signals.

8. The method of claim 1, wherein the generating of the fourth bit stream y(n) from the third bit stream x(n) by expanding the third bit stream x(n) by the predetermined factor M comprises:
generating the fourth bit stream y(n) from the third bit stream x(n) in dependence of a second bit stream b(n) of data for transmission and by expanding the third bit stream x(n) by the predetermined factor M; and
wherein the BPSK signal generated based on the fourth bit stream y(n) is a BPSK and Frequency Shift Keying, FSK, signal.

9. The method of claim 8, wherein the generating of fourth bit stream y(n) from the third bit stream x(n) in dependence of the second bit stream b(n) of data for transmission and by expanding the third bit stream x(n) by the predetermined factor M comprises:
generating the fourth bit stream y(n) to comprise all bit values of the third bit stream x(n);
inserting M−1 bits equal to 0 after each bit value from the third bit stream x(n) when the bit value of the second bit stream b(n) is 0; and
inserting M−1 bits equal to 1 after each bit value from the third bit stream x(n) when the bit value of the second bit stream b(n) is 1.

10. The method of claim 8, further comprising:
selecting a first centre frequency of the first network node to coincide with a second centre frequency of a subcarrier in of one of the OFDM subcarriers used by the second network node.

11. The method of claim 1, further comprising:
selecting a bit period $T_{CPM}$ such that the predetermined factor M multiplied with the bit period $T_{CPM}$ is equal to a time duration of one OFDM symbol $T_{OFDM}$ plus a time duration of a cyclic prefix $T_{CP}$.

12. The method of claim 1, wherein the first network node is configured to generate the CPM signal with a modulation index h=0.5.

13. A first network node for generation and transmission of a Binary Phase Shift Keying, BPSK, signal to a second network node, wherein the first and second network nodes are configured to operate in a communications network, and wherein the first network node is configured to:

generate a third bit stream x(n) from a first bit stream d(n) of data for transmission, wherein each output bit comprised in the third bit stream x(n) depends on a transition in bit values between two input bits from the first bit stream d(n);
generate a fourth bit stream y(n) from the third bit stream x(n) by expanding the third bit stream x(n) by a predetermined factor M,
wherein the predetermined factor M is a non-zero positive integer;
by means of a Continuous Phase Modulation, CPM, signal generating circuit comprised in the first network node, generate a BPSK signal based on the fourth bit stream y(n); and
transmit the BPSK signal to an Orthogonal Frequency Division Multiplexing, OFDM, signal receiving circuit of the second network node.

14. The first network node of claim 13, wherein the first network node is configured to generate the third bit stream x(n) from the first bit stream x(n) by being configured to:
assign an output bit of the third bit stream x(n) a first value when there is no transition in bit values between a first input bit and a second input bit from the first bit stream d(n), and
assign the output bit of the third bit stream x(n) a second value when there is a transition in bit values between the first input bit and the second input bit, wherein the first and second input bits are consecutive input bits, and wherein one of the first and second values is 1 and the other one of the first and second values is 0.

15. The first network node of claim 13, wherein the first network node is configured to generate the third bit stream x(n) from the first bit stream d(n) by being configured to:
differentially encode the first bit stream d(n) to generate the third bit stream x(n).

16. The first network node of claim 13, wherein the first network node is configured to generate the fourth bit stream y(n) from the third bit stream x(n) by expanding the third bit stream x(n) by the predetermined factor M by being configured to:
generate the fourth bit stream y(n) to comprise all bit values of the third bit stream x(n); and
insert M−1 bits equal to 0 after each bit value from the third bit stream x(n).

17. The first network node of claim 13, further being configured to:
select a first centre frequency of the first network node to be separated by a predetermined number of frequency units from a second centre frequency of a subcarrier in of one of the OFDM subcarriers used by the second network node.

18. The first network node of claim 17, wherein the predetermined number of frequency units results in a frequency separation between the first and second centre frequencies that is equal to a maximum frequency deviation of signals generated by the CPM signal generating circuit, wherein the maximum frequency deviation of the BPSK signal is equal to a frequency spacing between two OFDM signals.

19. The first network node of claim 13, wherein the first network node is configured to generate the fourth bit stream y(n) from the third bit stream x(n) by expanding the third bit stream x(n) by the predetermined factor M by being configured to:
generate the fourth bit stream y(n) from the third bit stream x(n) in dependence of a second bit stream b(n)

of data for transmission and by expanding the third bit stream x(n) by the predetermined factor M; and wherein the BPSK signal generated based on the fourth bit stream y(n) is a BPSK and FSK signal.

20. The first network node of claim 19, wherein the first network node is configured to generate the fourth bit stream y(n) from the third bit stream x(n) in dependence of the second bit stream b(n) of data for transmission and by expanding the third bit stream x(n) by the predetermined factor M by being configured to:

generate the fourth bit stream y(n) to comprise all bit values of the third bit stream x(n);

insert M−1 bits equal to 0 after each bit value from the third bit stream x(n) when the bit value of the second bit stream b(n) is 0; and insert M−1 bits equal to 1 after each bit value from the third bit stream x(n) when the bit value of the second bit stream b(n) is 1.

* * * * *